United States Patent
Zhao et al.

(10) Patent No.: US 9,598,087 B2
(45) Date of Patent: Mar. 21, 2017

(54) SYSTEMS AND METHODS FOR DETERMINING A CONDITION OF A ROAD SURFACE

(71) Applicant: GM GLOBAL TECHNOLOGY OPERATIONS LLC, Detroit, MI (US)

(72) Inventors: Qingrong Zhao, Madison Heights, MI (US); Qi Zhang, Sterling Heights, MI (US); Jinsong Wang, Troy, MI (US); Bakhtiar Litkouhi, Washington, MI (US); Wende Zhang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 98 days.

(21) Appl. No.: 14/568,656

(22) Filed: Dec. 12, 2014

(65) Prior Publication Data

US 2016/0167669 A1 Jun. 16, 2016

(51) Int. Cl.
G06K 9/00 (2006.01)
B60W 40/06 (2012.01)
H04N 5/225 (2006.01)

(52) U.S. Cl.
CPC ......... *B60W 40/06* (2013.01); *G06K 9/00791* (2013.01); *H04N 5/2256* (2013.01)

(58) Field of Classification Search
None
See application file for complete search history.

(56) References Cited

U.S. PATENT DOCUMENTS

| | | | |
|---|---|---|---|
| 9,139,204 B1* | 9/2015 | Zhao | G01C 21/00 |
| 2004/0204812 A1* | 10/2004 | Tran | B60T 8/172 |
| | | | 701/80 |
| 2008/0199045 A1* | 8/2008 | Ekin | G06K 9/00791 |
| | | | 382/104 |
| 2009/0067675 A1* | 3/2009 | Tan | G06K 9/00798 |
| | | | 382/104 |
| 2013/0027511 A1* | 1/2013 | Takemura | G06K 9/00805 |
| | | | 348/42 |
| 2014/0063250 A1* | 3/2014 | Park | H04N 5/23206 |
| | | | 348/148 |
| 2015/0086079 A1* | 3/2015 | Murao | G06K 9/00791 |
| | | | 382/104 |
| 2015/0178572 A1* | 6/2015 | Omer | G08G 1/0112 |
| | | | 382/108 |
| 2015/0371095 A1* | 12/2015 | Hartmann | G06K 9/00791 |
| | | | 348/148 |
| 2016/0101782 A1* | 4/2016 | Ghoneim | B60W 40/06 |
| | | | 701/41 |

FOREIGN PATENT DOCUMENTS

JP 2008217267 A * 9/2008

* cited by examiner

*Primary Examiner* — Vu Le
*Assistant Examiner* — Delomia L Gilliard
(74) *Attorney, Agent, or Firm* — Mickki D. Murray, Esq.; Parks IP Law LLC (57) ABSTRACT

Systems and methods use an image of a road surface that is generated by a camera. The image includes a pattern from a light source. A region of interest in the image is determined based on the pattern from the light source. A total area is determined that includes at least part of the region of interest and an area adjacent the region of interest. A feature vector is extracted based on the region of interest and the total area. A road condition is determined based on the feature vector and a classifier.

20 Claims, 7 Drawing Sheets

Fig_1

Fig_4

Fig_2

Fig. 3

Fig_7

Fig_12

Fig_8

Fig_13

Fig_9

Fig_14

Fig_10       Fig_11

Fig_15       Fig_16

Fig_19

SYSTEMS AND METHODS FOR DETERMINING A CONDITION OF A ROAD SURFACE

TECHNICAL FIELD

The present disclosure relates generally to systems and methods for determining a condition of a road surface.

BACKGROUND

It is valuable to determine a condition of a road surface for purposes of active safety, driver assistance, and vehicle stability. For example, determining that the road surface is wet or covered in ice (e.g., black ice) allows the vehicle to respond to the road condition.

Many previous approaches require expensive hardware and fail during certain lighting conditions. For example, certain previous approaches fail when environmental lighting conditions change (e.g., sunlight, street light, etc.), which makes the approaches inconsistent and unreliable.

SUMMARY

The present technology relates to systems and methods for detecting a condition of a road surface. The systems can use an economical lighting source such as a flash or light emitting diode (LED). The lighting source makes the systems and methods robust to varying environmental conditions.

According to an exemplary embodiment, a method includes accessing, by a processor, an image of a road surface that is generated by a camera. The image includes a pattern from a light source. The method further includes determining, by the processor, a region of interest in the image and a total area in the image. The region of interest includes pixels from the image and is based on the pattern from the light source. The total area includes pixels from the image and includes at least part of the region of interest and an area adjacent the region of interest. The method further includes extracting a feature vector based on characteristics of the region of interest and the total area and determining a road condition based on the feature vector and a classifier.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, and other vehicles.

Figure 1:
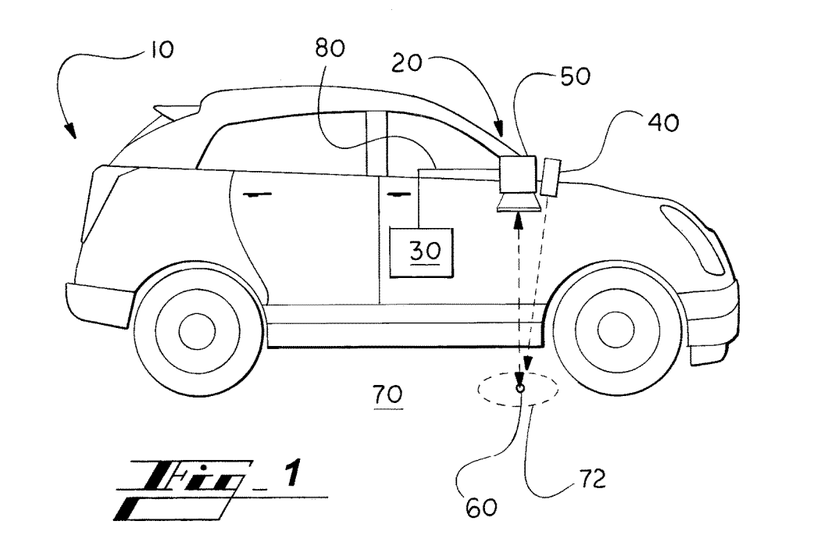
FIG. 1 illustrates schematically a vehicle including a road surface detection system, according to an embodiment of the present disclosure.

According to an embodiment illustrated in FIG. 1, a vehicle 10 includes a road surface detection system 20. The road surface detection system 20 includes a computing unit 30, a light source 40, and a camera 50.

The camera 50 can be mounted at various locations of the vehicle 10 giving it a view of the road surface 70. For example, the camera 50 is a front view camera, a right view camera, a left view camera, or a rearview camera.

The light source 40 includes one or more lighting devices such as a light emitting diode (LED), a flash, a laser, and the like. The light source 40 generates a pattern 86 (see FIGS. 4-6) on a road surface 70. For example, the pattern can be a spot, a dot, a line, a line of spots, a circle, other known geometrical shapes, and the like.

The camera 50 and the light source 40 are positioned and oriented such that the light pattern 86 from the light source 40 is reflected off of the road surface 70 to the camera 50. For example, each of the light source 40 and the camera 50 is aimed at a point of reflection 60 on the road surface 70. The light source 40 illuminates a road surface area 72 surrounding the point of reflection 60 to facilitate controlling the lighting of the road surface 70.

The camera 50 is configured to generate visual data, such as a video or an image 80 (See FIGS. 4-6), of the road surface 70 representing the illuminated road surface area 72 including the light pattern 86. For purposes of illustration, embodiments are described herein with respect to an image although the teachings of the disclosure are similarly applicable to a video.

For example, the image 80 is a grayscale image or is converted to a grayscale image. An image 80 is generated at different times (e.g., periodically or according to a trigger or other instructions).

In alternative embodiments, more than one camera, each camera paired with its own light source or using a shared light source, is configured to generate an image of the road surface. For example, each of a front view camera, a right view camera, a left view camera, and a rearview camera capture an image of the road surface at the same time.

Figure 2:
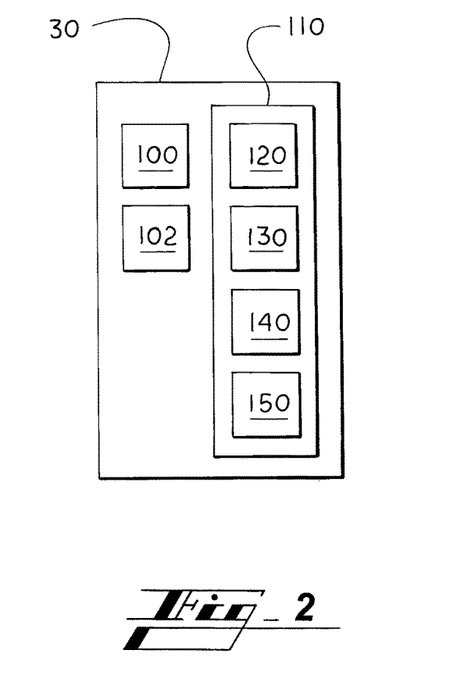
FIG. 2 illustrates a computing unit of the road surface detection system of FIG. 1.

Referring to FIG. 2 the computing unit is illustrated. The computing unit 30 is configured to access (e.g., receive directly from the camera 50 or access a stored version in the memory 110) the image 80 generated by the camera 50. The computing unit 30 includes a processor 100 for controlling and/or processing data (e.g., data of the image 80), input/output data ports 102, and a memory 110.

The processor could be multiple processors, which could include distributed processors or parallel processors in a single machine or multiple machines. The processor could include virtual processor(s). The processor could include a state machine, application specific integrated circuit (ASIC), programmable gate array (PGA) including a Field PGA, or state machine. When a processor executes instructions to perform "operations," this could include the processor performing the operations directly and/or facilitating, directing, or cooperating with another device or component to perform the operations.

The computing unit 30 can include a variety of computer-readable media, including volatile media, non-volatile media, removable media, and non-removable media. The term "computer-readable media" and variants thereof, as used in the specification and claims, includes storage media. Storage media includes volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that is configured to be used to store information that can be accessed by the vehicle computing unit 30.

While the memory 110 is illustrated as residing proximate the processor 100, it should be understood that at least a portion of the memory can be a remotely accessed storage system, for example, a server on a communication network, a remote hard disk drive, a removable storage medium, combinations thereof, and the like. Thus, any of the data, applications, and/or software described below can be stored within the memory and/or accessed via network connections to other data processing systems (not shown) that may include a local area network (LAN), a metropolitan area network (MAN), or a wide area network (WAN), for example.

The memory 110 includes several categories of software and data used in the computing unit 30 including applications 120, a database 130, an operating system 140, and input/output device drivers 150.

As will be appreciated by those skilled in the art, the operating system 140 may be any operating system for use with a data processing system. The input/output device drivers 150 may include various routines accessed through the operating system 140 by the applications to communicate with devices, and certain memory components. The applications 120 can be stored in the memory 110 and/or in a firmware (not shown) as executable instructions, and can be executed by the processor 100.

The applications 120 include various programs that, when executed by the processor 100, implement the various features of the computing unit 30. The applications 120 include image processing applications described in further detail with respect to exemplary methods. The applications 120 are stored in the memory 110 and are configured to be executed by the processor 100.

The applications 120 may use data stored in the database 130, such as that of characteristics measured by the camera 50 (e.g., received via the input/output data ports 102). The database 130 includes static and/or dynamic data used by the applications 120, the operating system 140, the input/output device drivers 150 and other software programs that may reside in the memory 110.

It should be understood that FIG. 2 and the description above are intended to provide a brief, general description of a suitable environment in which the various aspects of some embodiments of the present disclosure can be implemented. The terminology "computer-readable media", "computer-readable storage device", and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium, excluding propagating signals, that can be used to store information that can be accessed by the device shown in FIG. 2.

While the description refers to computer-readable instructions, embodiments of the present disclosure also can be implemented in combination with other program modules and/or as a combination of hardware and software in addition to, or instead of, computer readable instructions.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

Figure 3:
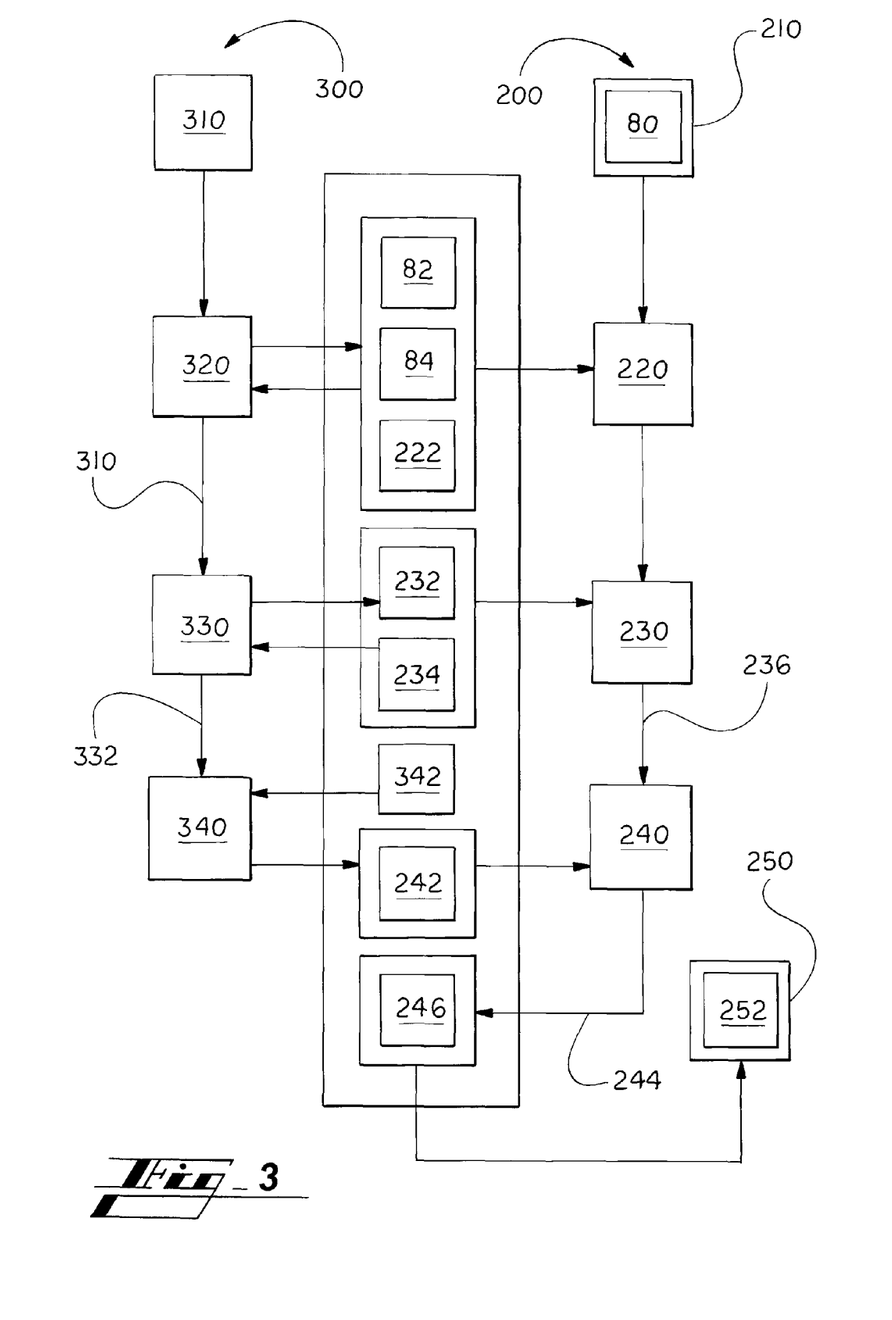
FIG. 3 illustrates a road condition analysis method and a classifier generation method.

FIG. 3 shows a road condition analysis method 200 and a classifier generation method 300 according to an embodiment of the present disclosure. It should be understood that the steps of methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims.

It should also be understood that the illustrated methods can be ended at any time. In certain embodiments, some or all steps of this process, and/or substantially equivalent steps are performed by execution of computer-readable instructions stored or included on a computer readable medium, such as the memory 110 of the computing unit 30 described above, for example.

Referring to FIG. 3, a road condition analysis method 200 described herein includes an image capture step 210, a preprocessing step 220, a feature vector generation step 230, a classification step 240, and a road condition decision step 250. The steps are now described briefly and then applied in further detail below with respect to exemplary applications.

The preprocessing step 220 includes generating or selecting a region intensity matrix, and a total intensity matrix in the image 80 using a region of interest 82 and a total area 84. The preprocessing step 220 also includes converting the image 80 to a form for feature extraction using at least one preprocessing technique 222 (e.g., conversion to a binary image or a gray-scale image). The preprocessing step may also include noise removal, dewarping, and the like.

For purposes of clarity, although a feature extraction technique is used, to distinguish from features that form a feature vector, features that are extracted from the matrices may be referred to as characteristics.

The feature vector generation step 230 includes extraction of characteristics from each of the matrices using a feature extraction technique 232. Characteristics are then selected and combined according to a feature selection technique 234. Exemplary features and equations that combine features are described in further detail below. The selected features form a feature vector 236 that is used at the classification step 240.

The classification step 240 includes classification of the feature vector 236 using a classifier 242 to determine a road condition 244.

The road condition decision step 250 includes determining an overarching road condition 252 based on multiple road conditions. For example, road conditions saved in a road condition database 246 (e.g., road condition 244 and road conditions determined previous to or in parallel with road condition 244) are used to determine an overarching road condition 252.

A classifier generation method 300 uses a set of training images 310 and includes a preprocessing step 320, a feature vector generation step 330, and a classifier generation step 340. Generally, the classifier generation method 300 uses the set of training images 310; selects and applies the preprocessing technique 222; selects and applies the feature extraction technique 232; selects and applies the feature selection technique 234; and selects and applies a classification technique 342. The preprocessing technique 222, the feature extraction technique 232; the feature selection technique 234; and the classifiers 242 are stored in the memory 110 for use with the road condition analysis method 200. The classifier generation method 300 is now described in further detail.

Figure 4:
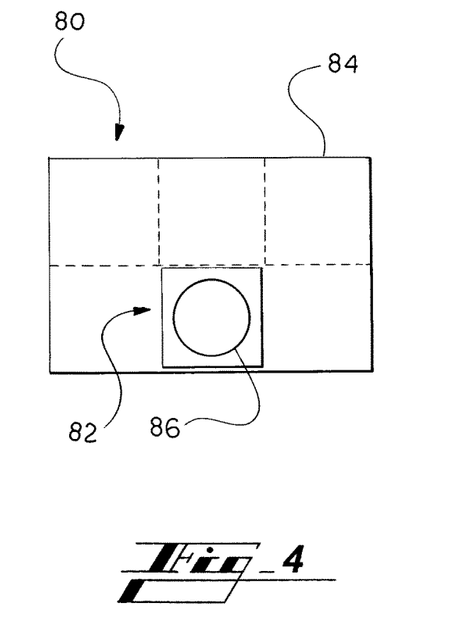
FIG. 4 illustrates an image of a camera of the road surface detection system of FIG. 1.

Referring to FIG. 4, according to the preprocessing step 320, the computing unit 30 selects a region of interest 82 and a total area 84 from the image 80. Generally, the region of interest 82 is based on a position and geometry of a light pattern 86 from the light source 40 and the total area 84 includes and surrounds or neighbors the region of interest 82. For example, the total area 84 includes the region of interest 82 and the region of interest 82 includes the light pattern 86. In alternative embodiments, the total area includes at least part of the region of interest and is adjacent the region of interest.

For purposes of teaching, the region of interest 82 is a square area that closely surrounds a circular light pattern 86 (e.g., a spot). The total area 84 includes the region of interest 82 and five other similarly-sized square areas surrounding the region of interest 82. Here, the total area 84 is broken into sub-areas and the sub-area that includes the light pattern 86 is selected as the region of interest 82.

Alternatively, one or more regions of interest 82 may be defined by a size and shape of a light pattern 86 from the light source 40. The size and shape of the light pattern depends on the light source, the camera mounting position, and the specific application case. The region of interest 82 may be various geometries such as a circle or a rectangle and, in certain embodiments, is fit to the geometry of the pattern of the light source 40.

Figures 5, 6:
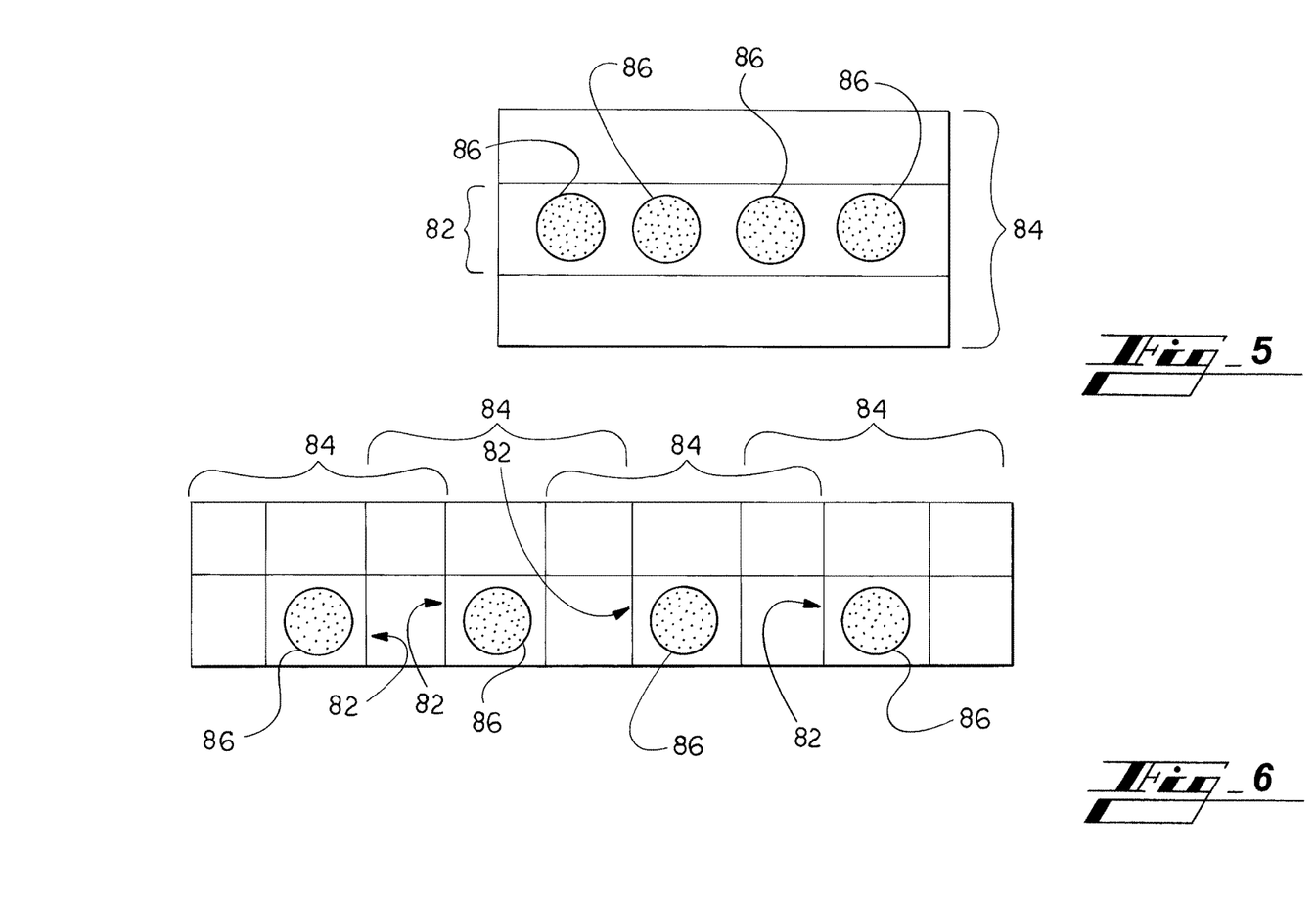
FIG. 5 illustrates an image of a camera of the road surface detection system of FIG. 1.
FIG. 6 illustrates an image of a camera of the road surface detection system of FIG. 1.

For example, referring to FIGS. 5 and 6, if the light pattern 86 is a line of light spots, a single region of interest 82 can include the light pattern 86 (FIG. 5); or multiple regions of interest 82 are selected with each region of interest 82 including a light spot of the light pattern 86 (FIG. 6). Methods below are described for a single region of interest 82 and other methods are described for multiple regions of interest 82. For multiple regions of interest 82, a decision algorithm can be used to determine an overarching decision about the condition of the road surface based on the road condition determined based on each of the regions of interest 82.

The total area 84 and the region of interest 82 correspond to pixels from the image 80. For example, the total area 84 and the region of interest 82 are boundary locations that are saved in the memory 110 and used to select pixels from the image 80. A matrix of pixels of the total area 84 is referred to herein as a total intensity matrix $I_T$. Each pixel is an element (i,j) in a row (i) and a column (j) of the total intensity matrix $I_T$. Each element (i,j) has an intensity value $I_T(i,j)$. The total intensity matrix $I_T$ for the total area 84 has $X_T$ rows and $Y_T$ columns.

Each pixel in the region of interest 82 is an element (i,j) in a row (i) and a column (j) of a region intensity matrix $I_R$. Each element (i,j) has an intensity value $I_R(i,j)$. The region intensity matrix $I_R$ for the region of interest 82 has $X_R$ rows and $Y_R$ columns.

The pixels of the total area 84 include the pixels of the region of interest 82. Although the pixels in the region of interest 82 are a subset of the pixels in the total area 84, for clarity and purposes of processing, the pixels in the region of interest 82 are copied from the total intensity matrix $I_T$ (e.g., of the total area 84) and saved separately as a region intensity matrix $I_R$. This makes the equations below simpler because the rows and elements of region intensity matrix $I_R$ start with i=1 and j=1, respectively. However, the equations below can be modified, with each of the elements in the region intensity matrix $I_R$ linearly mapped to the total intensity matrix $I_T$.

Figure 7:
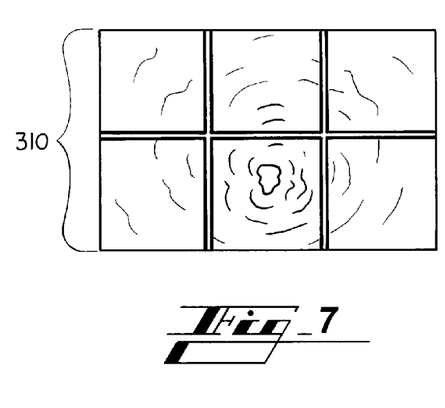
FIG. 7 illustrates a training image of a road surface during a wet road condition.
Figure 8:
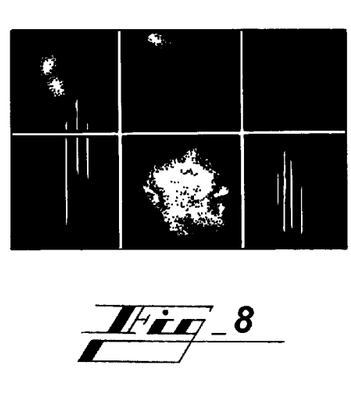
FIG. 8 illustrates a training image of a road surface during a black ice road condition.
Figure 9:
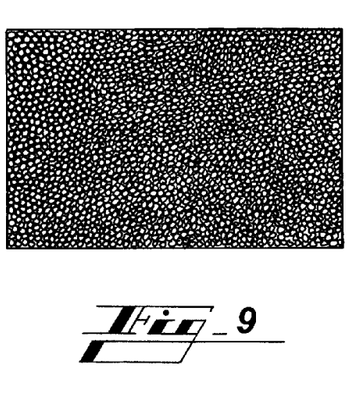
FIG. 9 illustrates a training image of a road surface during a dry road condition.
Figure 10:
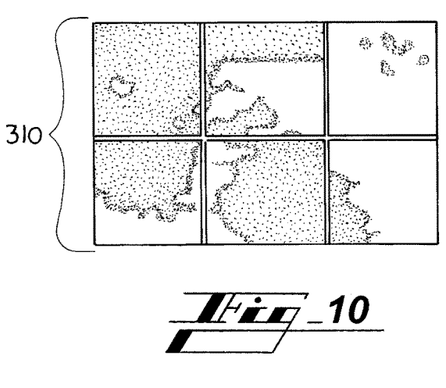
FIG. 10 illustrates a training image of a road surface during a fresh snow road condition.
Figure 11:
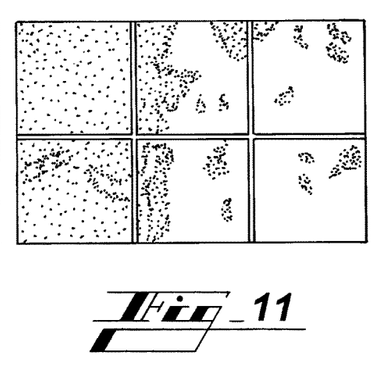
FIG. 11 illustrates a training image of a road surface during a slushy snow road condition.

Referring to FIGS. 7-11, the training images 310 illustrate different road conditions. For example road conditions include: the road surface 70 is wet, there is ice (e.g., black ice) on the road surface 70, the road surface 70 is dry, there is fresh snow on the road surface 70, and there is slushy snow on the road surface 70. FIG. 7 is a training image 310 where the road surface 70 is wet, FIG. 8 is a training image 310 of ice (e.g., black ice) on the road surface 70, FIG. 9 is a training image 310 where the road surface 70 is dry, FIG. 10 is a training image 310 of fresh snow on the road surface 70, and FIG. 11 is a training image 310 of slushy snow on the road surface 70.

According to the preprocessing step 320, the region intensity matrix $I_R$ and the total intensity matrix $I_T$ are processed according to the preprocessing technique 222. Image processing techniques include, but are not limited to, converting to binary, converting to grayscale, filter techniques (e.g., Laplacian of Gaussian (LOG) filter), wrapper methods, and embedded techniques.

In some applications, the preprocessing technique 222 includes processing each of the region intensity matrix $I_R$ and the total intensity matrix $I_T$ with different techniques (e.g., more than one) to expand the number of features that can be extracted. For example, the preprocessing technique 222 uses binary and LOG processing, separately, to create a binary region intensity matrix $I_R$, a binary total intensity matrix $I_T$, a LOG region intensity matrix $I_R$, and a LOG total intensity matrix $I_T$.

Figure 12:
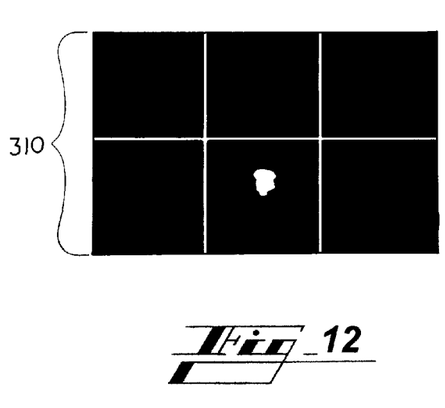
FIG. 12 illustrates the training image of FIG. 7 as a binary training image.
Figure 13:
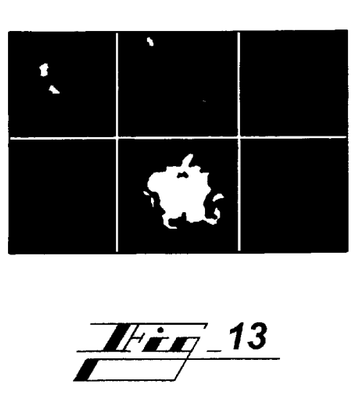
FIG. 13 illustrates the training image of FIG. 8 as a binary training image.
Figure 14:
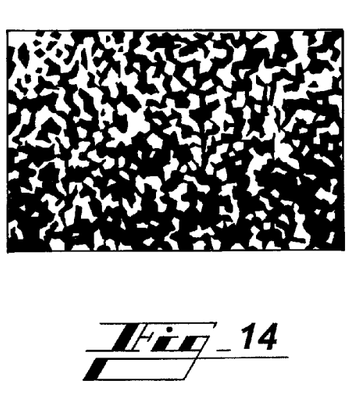
FIG. 14 illustrates the training image of FIG. 9 as a binary training image.
Figure 15:
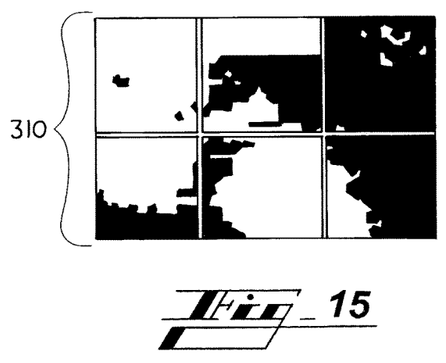
FIG. 15 illustrates the training image of FIG. 10 as a binary training image.
Figure 16:
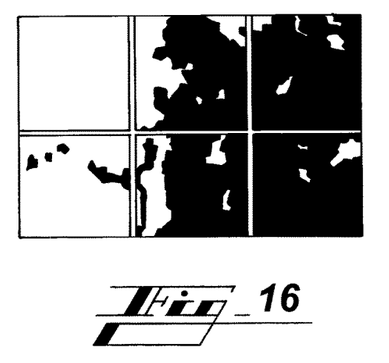
FIG. 16 illustrates the training image of FIG. 11 as a binary training image.

According to an exemplary preprocessing step 320, the computing unit 30 converts the total intensity matrix $I_T$ and the region intensity matrix $I_R$ from grayscale to binary. For purposes of teaching, each of the training images 310 in FIGS. 7-11 is shown as converted to a binary training image 310 in FIGS. 12-16. FIG. 12 is a binary training image 310 generated from the grayscale training image 310 of FIG. 7, FIG. 13 is a binary training image 310 generated from the grayscale training image 310 of FIG. 8, FIG. 14 is a binary training image 310 generated from the grayscale training image 310 of FIG. 9, FIG. 15 is a binary training image 310 generated from the grayscale training image 310 of FIG. 10, and FIG. 16 is a binary training image 310 generated from the grayscale training image 310 of FIG. 11.

For example, the processor 100 converts the total intensity matrix $I_T$ and the region intensity matrix $I_R$ from grayscale to binary by replacing all pixels in each of the total intensity matrix $I_T$ and the region intensity matrix $I_R$ with intensity greater than a certain level with the value one (i.e., white) and replaces all other pixels with the value zero (i.e., black). The level is variable and is specified in a range from zero to one.

For example, the level is determined by Otsu's method, which automatically performs clustering-based image thresholding. The algorithm assumes that the image contains two classes of pixels following bi-modal histogram and calculates the optimum threshold separating the two classes so that their combined spread (intra-class variance) is minimal.

Referring to the feature vector generation step 330, features are extracted from the matrices according to a feature extraction technique 232. Particularly, each of the matrices is transformed into a reduced representation set of features. The features that are extracted may be dependent on the selected preprocessing technique 222. Feature extraction techniques 232 include, but are not limited to, filtering techniques (e.g., LM filter bank), texture feature analysis based on co-occurrence matrix, spatial frequency analysis, and intensity histogram analysis.

Extracted features of the matrices include average intensity, variation of intensity, maximum response (e.g., after LOG filter is applied), combinations thereof, and the like.

The feature vector generation step 330 further includes selecting features from the sets of characteristics that are extracted from each matrix according to a feature selection technique. Each selected feature is a dimension of a feature vector.

For example, if a set of characteristics that is extracted from a matrix is large, the feature selection technique 234 may be applied to select a subset of the set of characteristics in an effort to remove redundant or irrelevant characteristics (e.g., characteristics that do not differentiate one road condition from another) and thereby reduce the dimensions of the feature vector. Feature selection techniques 234 include, but are not limited to, principle component analysis, singular value decomposition, independent components analysis, or the like.

In addition, the feature selection technique 234 may be applied to combine extracted characteristics (e.g., according to equations) to create features of the feature vector. The techniques for selecting and combining extracted characteristics are stored as the feature selection technique 234 for generating a feature vector (e.g., feature vector 236 or training feature vectors 332 described below). Exemplary features are now described in further detail.

Below, a first feature 400 (feature1) is based on comparing dispersion in the region of interest 82 (region intensity matrix $I_R$) to dispersion in the total area 84 (total intensity matrix $I_T$). The first feature 400 (feature1) separates the road conditions that are more evenly dispersed over the total area 84 from road conditions where the dispersion is concentrated in the region of interest 82.

A first mean intensity is extracted from the region intensity matrix and a second mean intensity is extracted from the total intensity matrix. The first mean intensity and the second mean intensity are then combined to define the first feature 400. Particularly, the first feature 400 (feature1) is a mean of the intensity values of the region intensity matrix $I_R$ (the region of interest 82) divided by a mean of the intensity values of the total intensity matrix $I_T$ (total area 84). The first feature 400 has a larger value where the mean of intensity in the region of interest 82 is larger compared to the mean of intensity in the total area 84.

For example, the first feature 400 is calculated as:

$$\text{Feature1} = \frac{\frac{1}{X_R * Y_R}\sum_{i=1}^{X_R}\sum_{j=1}^{Y_R} I_R(i,j)}{\frac{1}{X_T * Y_T}\sum_{i=1}^{X_T}\sum_{j=1}^{Y_T} I_T(i,j)} \qquad \text{Equation 1}$$

Where $X_R$ is the number or rows of the region intensity matrix $I_R$; $Y_R$ is the number of columns of the region intensity matrix $I_R$; the region intensity matrix $I_R$ is the matrix of intensity values of the region of interest 82; $X_T$ is the number or rows of the total intensity matrix $I_T$; $Y_T$ is the number of columns of the total intensity matrix $I_T$; and the total intensity matrix $I_T$ is the matrix of intensity values of the total area 84.

A second feature 402 (feature2) is based on dispersion in the region of interest 82 (region intensity matrix $I_R$) to differentiate between road conditions where the dispersion is concentrated in the region of interest 82.

A variance of intensity is extracted from the region intensity matrix. The variance of intensity defines the second feature 402. Particularly, the second feature 402 (feature2) is a variance of the intensity of the region intensity matrix (region of interest 82). For example, the second feature 402 is calculated as:

$$\text{Feature2} = \frac{1}{X_R * Y_R}\sum_{i=1}^{X_R}\sum_{j=1}^{Y_R} (I_R(i,j) - \mu_R)^2 \qquad \text{Equation 2}$$

Where $X_R$ is the number or rows of the region intensity matrix $I_R$; $Y_R$ is the number of columns of the region intensity matrix $I_R$; the region intensity matrix $I_R$ is the matrix of intensity values of the region of interest 82; and $\mu_R$ is the mean of the intensity values of the region intensity matrix $I_R$.

A first variance of intensity is extracted from the region intensity matrix and a second variance of intensity is extracted from the total intensity matrix. The first variance of intensity and the second variance of intensity are then combined to define the third feature 404. Particularly, the third feature 404 (feature3) is a variance of the intensity values of the region intensity matrix $I_R$ (the region of interest 82) divided by a variance of the intensity values of the total intensity matrix $I_T$ (total area 84). For example, the third feature 404 (feature3) is calculated as:

$$\text{Feature3} = \frac{\frac{1}{X_R * Y_R}\sum_{i=1}^{X_R}\sum_{j=1}^{Y_R}(I_R(i,j)-\mu_R)^2}{\frac{1}{X_T * Y_T}\sum_{i=1}^{X_T}\sum_{j=1}^{Y_T}(I_T(i,j)-\mu_T)^2} \qquad \text{Equation 3}$$

Where $X_R$ is the number or rows of the region intensity matrix $I_R$; $Y_R$ is the number of columns of the region intensity matrix $I_R$; the region of intensity matrix $I_R$ is the matrix of intensity values of the region of interest 82; $\mu_R$ is the mean of the intensity values of region intensity matrix $I_R$; $X_T$ is the number or rows of the total intensity matrix $I_T$; $Y_T$ is the number of columns of the total intensity matrix $I_T$; the total intensity matrix $I_T$ is the matrix of intensity values of the total area 84; $\mu_T$ is the mean of the intensity values of the total intensity matrix $I_T$.

Similar to the first feature 400 (feature1), the third feature 404 (feature3) separates wet road conditions and black ice from other road conditions. If the third feature 404 (feature3) is approximately one, the variation of the intensity of the total area 84 is diffused or spread to a greater degree over the total area 84 (including the region of interest 82). Road surface conditions where the variation of the intensity in an image 80 is diffused to a greater degree over the total area 84 include where the road surface 70 is dry, where there is fresh snow on the road surface 70, or where there is slushy snow on the road surface 70.

If variation of the intensity of the region of interest 82 is greater than the intensity of the total area 84 (black ice or puddle case), then, the third feature is considerably large. Otherwise, if the variation of the intensity of the region of interest 82 is similar to the total area 84 (dry case), then, the third feature is small compared to the black ice or puddle cases.

A maximum intensity is extracted from the region intensity matrix. The maximum intensity defines a fourth feature 406. For example, the fourth feature 406 (feature4) is calculated as:

$$\text{Feature4} = \max(I_R) \qquad \text{Equation 4}$$

These features (e.g., feature1, feature2, feature3, and feature4) are only an exemplary set of selected features that may be stored as part of the feature selection technique 234. Alternative features may be defined and selected by applying feature extraction and selection techniques mentioned above.

According to the classifier generation step 340, classifiers 242 are generated using training feature vectors 332. The training images 310 are processed according to the selected preprocessing technique 222 to create a processed region intensity matrices $I_R$ and processed total intensity matrices $I_T$. Characteristics are extracted from the processed matrices according to the feature extraction technique 232 and the extracted characteristics are selected and combined according to the feature selection technique 234 to generate a set of training feature vectors 332. Each of the set of training feature vectors 332 is associated with a known road condition. At the classifier generation step 340, the set of training feature vectors 332 is used to generate classifiers 242 using a classification technique 342.

Classification techniques 342 include support vector machine (SVM), linear discriminant analysis (LDA), adaBoost, random forest, clustering and the like. The classification technique 342 is used to design a classifier 242 by training the classifier 242 using the set of training feature vectors 332 associated with known conditions.

Each of the classifiers 242 include a boundary in the feature space that differentiates among different types of road conditions. Alternatively described, each classifier 242 is a bounded space that represents a known condition. Exemplary classification techniques 342 are now described in further detail.

Figure 17:
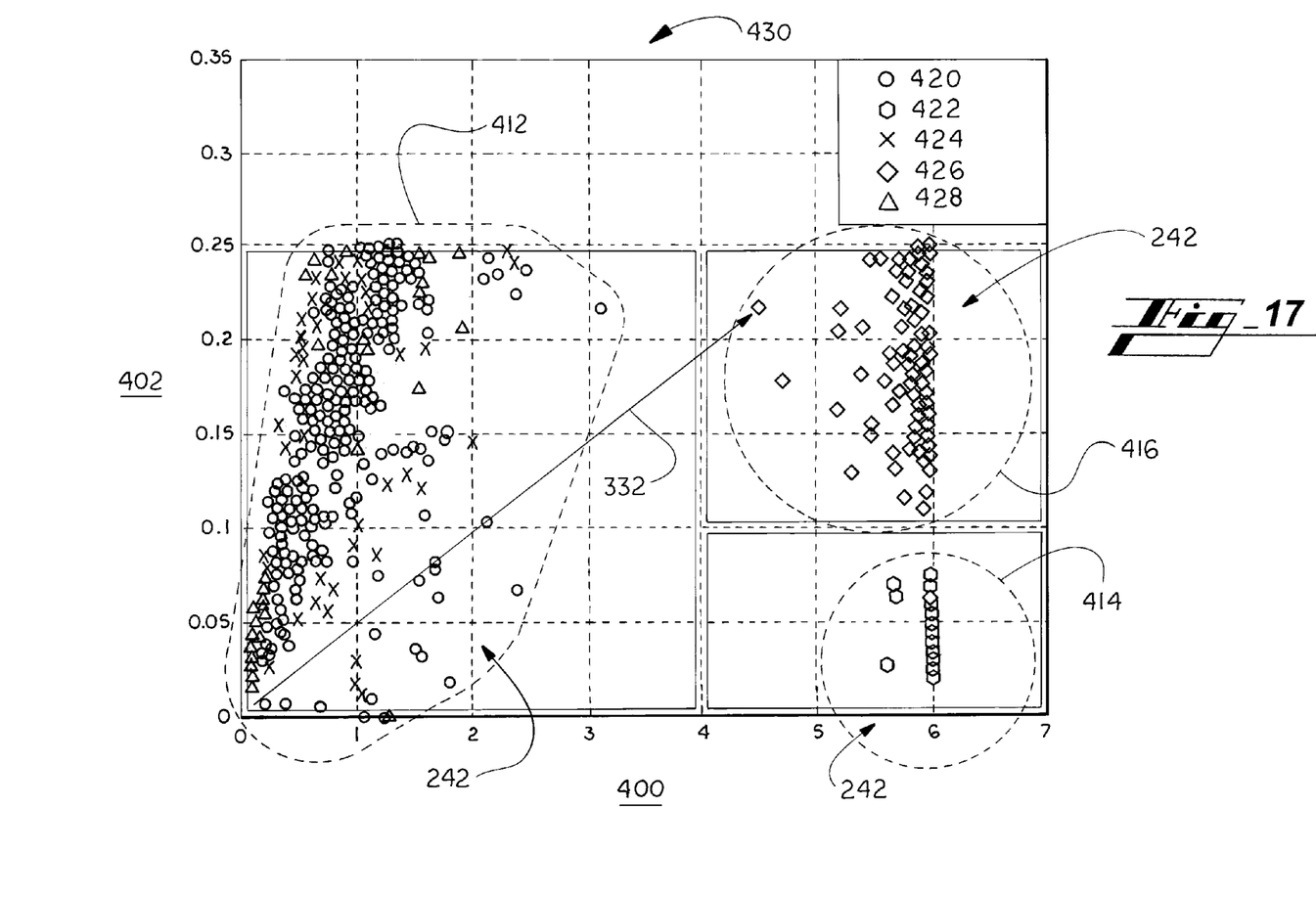
FIG. 17 is a graphical illustration of a set of training feature vectors and boundaries representing classifiers.

Referring to FIG. 17, for each image in the set of training images 310, the region intensity matrix and the total intensity matrix is selected and is converted to binary (e.g., an exemplary preprocessing technique 222). For each image in the set of training images 310, features are extracted from the processed region intensity matrix and the total intensity matrix (e.g., according to an exemplary feature extraction technique 232); the first feature 400 and the second feature 402 are selected and calculated (e.g., according to an exemplary feature selection technique 234) to generate a training feature vector 332 (in FIG. 17, only one labeled for clarity, the rest shown as data points). Here, the training feature vector 332 is two dimensional—one dimension is a value in a dimension of the first feature 400 and a second dimension is a value in a dimension of the second feature 402.

In FIG. 17, for each training feature vector 332, a data point is identified symbolically (e.g., circle, hexagon, x, diamond, triangle) based on the road condition (different conditions represented here are dry 420, puddle 422, fresh snow 424, black ice 426, slush snow 428) and the data point is plotted on a graph 430. The value of the first feature 400 is plotted along the x-axis and the value of the second feature 402 is plotted along the y-axis.

Classifiers 242 (exemplary boundaries shown by boundaries 412, 414, 416), each associated with one or more road conditions 420, 422, 424, 426, 428, are determined. Generally, each classifier 242 can be fit to a cluster of training feature vectors 332 that are associated with a known road condition (or multiple road conditions). For example, using a Support Vector Machine classification technique and the set of training feature vectors 332, a classifier (e.g., represented by equations or functions) will include decision boundaries.

The circles and lines of the classifiers in FIG. 17 highlight the clusters of feature vectors and represent decision boundaries of classifiers. However, the decision boundaries that are generated by classification techniques or manually can have any geometry. For example, the boundaries of the classifiers 242 can have different shapes and dimensions depending on the classification technique and the set of training feature vectors 332.

For purposes of illustration, the classifier 242 with boundary 412 is fit to a cluster of training feature vectors 332 that are associated with dry 420, fresh snow 424, and slushy snow 428 road conditions; the classifier 242 with boundary 414 is fit to a cluster of training feature vectors 332 that are associated with wet 422 road conditions, and the classifier 242 with boundary 416 is fit to a cluster of training feature vectors 332 that are associated with black ice 426 road conditions.

The spatial dimensions of a classifier 242 depend on the number of features selected using the feature selection technique 234. For example, for a feature vector using two features, the classifier 242 is two-dimensional (e.g., an area).

In FIG. 17, the classifiers 242 with boundaries 414, 416 are separate from the classifier 242 with boundary 412 because, in general, the first feature 400 is larger for wet 422 and black ice 426 and smaller for other road conditions 420, 424, 428. For example, if the intensity of the total area 84 is diffused or spread to a greater degree over the total area 84 (including the region of interest 82), the first feature 400 is approximately one. Road surface conditions where the intensity is diffused to a greater degree over the total area 84 include where the road surface 70 is dry, where there is fresh snow on the road surface 70, or where there is slushy snow on the road surface 70.

If the intensity of the total area 84 is concentrated (e.g., less diffused) in the region of interest 82 or is otherwise much greater in the region of interest 82 than the rest of the total area 84, the first feature 400 is much larger than one. For example, if the first feature 400 is greater than four, the intensity is concentrated in the region of interest 82. If the intensity is concentrated in the region of interest 82, the road condition is one of a wet road condition or a black ice road condition.

The classifiers 242 with boundaries 414, 416 are separate from one another because, generally, the second feature 402 is larger for a black ice 426 road condition and smaller for a wet 422 road condition. Particularly, the variance of a wet 422 road condition is less than the variance of a black ice 426 road condition. In other words, the reflection from a wet road surface is more tightly concentrated around a point of reflection within the region of interest 82.

Figure 18:
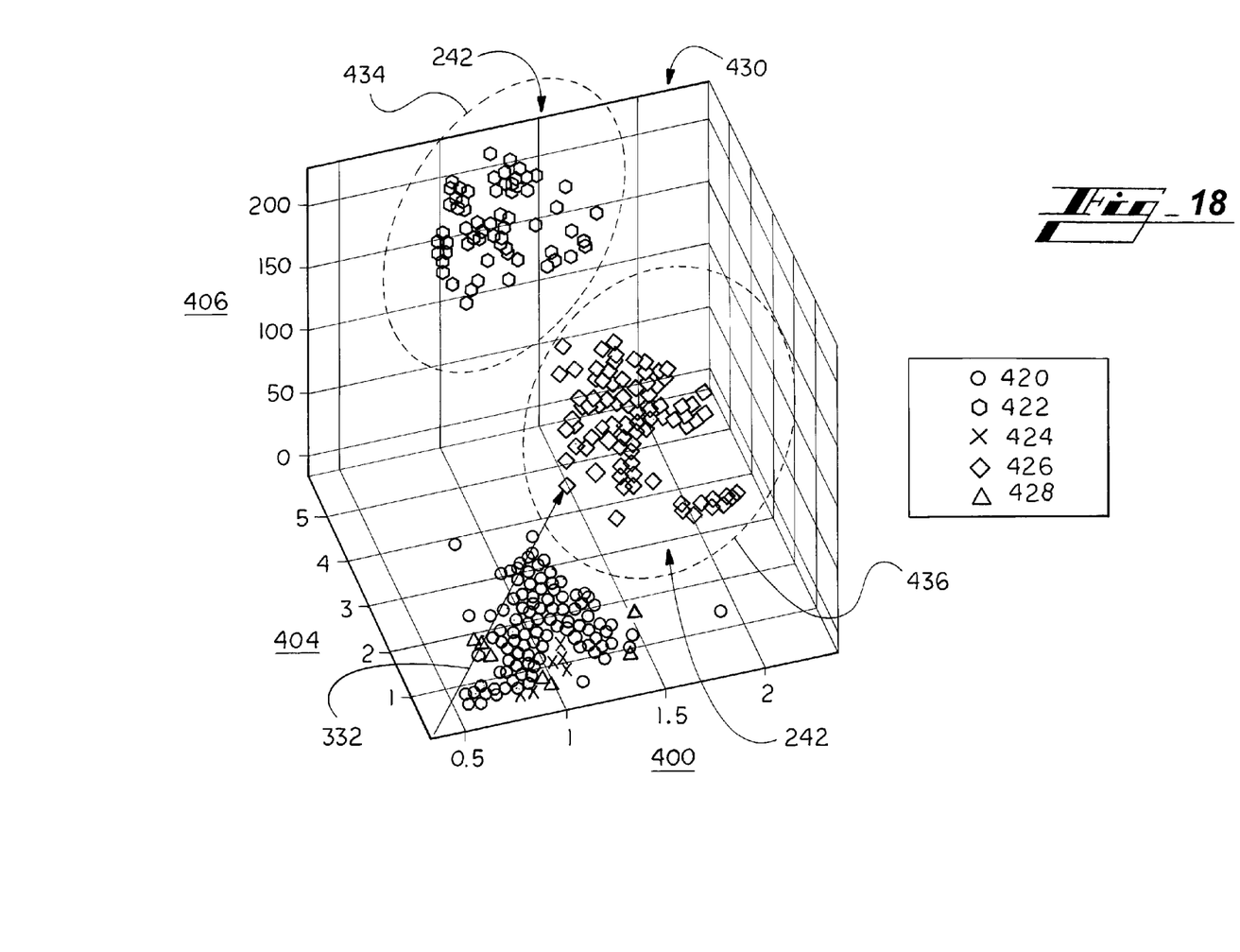
FIG. 18 is a graphical illustration of a sets of training feature vectors and boundaries representing classifiers.

Referring to another example shown in FIG. 18, classifiers 242, each associated with a road condition, are determined according to the classifier generation method 300.

Here, for each image in the set of training images 310, the region intensity matrix and the total intensity matrix is selected and is converted to both grayscale and filtered with a Laplacian of Gaussian (LOG) filter at the preprocessing step 320 (e.g., according to a selected preprocessing technique 222). At the feature vector generation step 330, for each processed matrix, characteristics are extracted according to a selected feature extraction technique 232. According to a feature selection technique 234, the first feature 400 is generated from characteristics extracted from each of the grayscale total intensity matrix $I_T$ and the grayscale region intensity matrix $I_R$; the third feature 404 is generated from characteristics extracted from each of the grayscale total intensity matrix $I_T$ and a grayscale region intensity matrix $I_R$; and the fourth feature 406 is generated from a characteristic extracted from the LOG region intensity matrix $I_R$.

For each training image 310, the values of the first feature 400, the third feature 404, and the fourth feature 406 provide a training feature vector 332 (e.g., only one labeled for clarity, the rest shown as data points). Each training feature vector 332 includes a value in a dimension of each of the first feature 400, the third feature 404, and the fourth feature 406.

As above, at the classifier generation step 340, classifiers 242 with boundaries (e.g., boundaries 434, 436) are fit to clusters of training feature vectors 332 according to a classification technique 342.

Referring again to FIG. 3, at the image capture step 210, the image 80 is generated by the camera 50. The image 80 is accessed by the computing unit 30.

At the preprocessing step 220, the computing unit 30 selects each of the total intensity matrix $I_T$ and the region intensity matrix $I_R$ is according to the region of interest 82 and the total area 84 stored in the memory 110. Additionally, the total intensity matrix $I_T$ and the region intensity matrix $I_R$ are processed according to the preprocessing technique 222 stored in the memory 110.

At the feature vector generation step 230, the computing unit 30 generates a feature vector 236. The computing unit 30 extracts characteristics from the processed matrices according to the feature extraction technique 232 stored in the memory 110. The computing unit 30 then selects and generates features according to the feature selection technique 234 and generates the feature vector 236.

At the classification step 240, the computing unit 30 determines a road condition based on the feature vector 236 and classifiers 242 stored in the memory 110. For example, the computing unit 30 compares the feature vector 236 to the classifiers 242 and, if the feature vector 236 falls within a boundary of a classifier 242, a road condition 244 associated with the classifier 242 is determined or selected by the computing unit 30.

At the road condition decision step 250, the road condition 244 from the classification step 240 is an overarching road condition 252. Alternatively, at the road condition decision step 250, multiple road conditions from a road condition database 246 are analyzed and synthesized to determine the overarching road condition 252.

Generally, using the road condition analysis method 200 through the classification step 240, the road condition 244 is determined for each paired region of interest 82 and total area 84. Multiple pairs can be selected from a single image 80 (e.g., as in FIG. 6) and pairs can be selected in different images 80. In the case of multiple images 80, for example, images 80 are captured by different cameras 50 at the same time and at least one pair is in each image; or, a series images are captured by a camera 50 over time (e.g., as in FIG. 19) and at least one pair is in each image.

Figure 19:
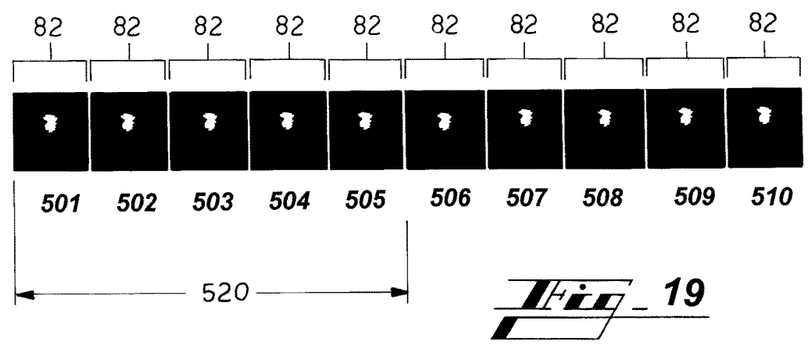
FIG. 19 illustrates a region of interest of a series of images generated over time.

Referring to FIG. 19, a series of images 80 are used to determine an overarching road condition 252. Here, the road condition analysis method 200 is used to determine a road condition 244 at each of times 501, 502, 503, 504, 505, 506, 507, 508, 509, 510 and the road conditions 244 are saved in the road condition database 246. Then, more than one road condition 244 from the road condition database 246 is used to determine the overarching road condition 252. For example, road conditions 244 at times 501, 502, 503, 504, 505 in a time window 520 are counted. As an example, the overarching road condition 252 for the time window 520 is the road condition 244 that is counted the most. For example, if black ice is counted three times, then black ice is the overarching road condition 252. Alternatively, if the count of a road condition 244 is greater than a threshold, the road condition 244 is the overarching road condition 252. For example, black ice is selected as the road condition if black ice is the road condition for at least two times in the time window 520.

The time window 520 then moves and road conditions at times 502, 503, 504, 505, 506 in the time window 520 are counted, and so on.

The time window 520 reduces noise and provides a higher confidence level of correct road surface identification. The time window 520 can be a different size to include more or fewer times. The time window 520 can be reset at different time instances.

Various embodiments of the present disclosure are disclosed herein. The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, comprising:
   accessing, by a processor, an image of a road surface that is generated by a camera, wherein the image includes a pattern from a light source;
   determining, by the processor, a region of interest in the image, the region of interest including pixels from the image, wherein the region of interest is based on the pattern from the light source;
   determining, by the processor, a total area in the image, the total area including pixels from the image, wherein the total area includes at least part of the region of interest and an area adjacent the region of interest;
   extracting a feature vector based on characteristics of the region of interest and the total area; and
   determining a road condition by comparing the feature vector to a classifier.

2. The method of claim 1, wherein the pixels of the region of interest are a subset of the pixels of the total area.

3. The method of claim 1, wherein the classifier includes a boundary that represents a road condition.

4. The method of claim 3, wherein the classifier includes a boundary that represents a road condition that is one of an ice-covered surface and a water-covered surface.

5. The method of claim 3, wherein the classifier is generated using one of a support vector machine technique and a linear discriminant analysis technique.

6. The method of claim 1, further comprising converting, by the processor, the region of interest and the total area to one of: binary values; and values generated using a Laplacian of Gaussian filter.

7. The method of claim 1, wherein the extracting a feature vector includes:
   extracting a first set of characteristics from the region of interest;
   extracting a second set of characteristics from the total area; and
   generating a feature vector based on the first set of characteristics and the second set of characteristics.

8. The method of claim 7, wherein:
   the first set of characteristics includes a mean of intensity of the region of interest;
   the second set of characteristics includes a mean of intensity of the total area; and
   the feature vector includes a first feature that is the mean of intensity of the region of interest divided by the mean of intensity of the total area.

9. The method of claim 7, wherein:
   the first set of characteristics includes a variance of intensity of the region of interest; and
   the feature vector includes a first feature that is the variance of intensity of the region of interest.

10. The method of claim 7, wherein:
    the first set of characteristics includes a variance of intensity of the region of interest;
    the second set of characteristics includes a variance of intensity of the total area; and
    the feature vector includes a first feature that is the variance of intensity of the region of interest divided by the variance of intensity of the total area.

11. The method of claim 7, the feature vector includes a first feature that is a maximum response of the region of interest after being processed by a Laplacian of Gaussian filter.

12. The method of claim 1, wherein extracting a feature vector includes selecting a subset of features using a principle component analysis technique.

13. The method of claim 1, wherein the road condition is a first road condition, the method further comprising:
    accessing a second road condition; and
    determining an overarching road condition indication based on at least the first road condition and the second road condition.

14. The method of claim 13, wherein the region of interest is a first region of interest;
    wherein the first road condition is based on the first region of interest;
    wherein the second road condition is based on a second region of interest;
    and wherein the first region of interest and the second region of interest are distributed over at least one of time and space.

15. The method of claim 14, wherein the first region of interest and the second region of interest include different pixels in the image.

16. The method of claim 15, wherein the first region of interest and the second region of interest are selected based on the pattern of the light source.

17. The method of claim 14, wherein the first region of interest and the second region of interest are in different images, wherein the different images are at least one of generated at different times and generated by different cameras.

18. A system, for use with a vehicle, comprising:
    a light source configured to provide a light pattern on a road surface;
    a camera configured to generate an image of the road surface, the image including the light pattern;
    a processor; and
    a memory, comprising:
    instructions that, when executed by the processor, cause the processor to perform operations, the operations comprising:
    accessing an image of a road surface that is generated by the camera, the image including pixels, each of the pixels having an intensity value;
    determining a region of interest from the image, the region of interest including pixels from the image;
    determining a total area from the image, the total area including pixels from the image, wherein the total area includes pixels in the region of interest and pixels in an area of the image that is adjacent of the region of interest;
    extracting a feature vector based on the region of interest and the total area; and
    determining a road condition based on the feature vector and a classifier.

19. The system of claim 18, the extracting a feature vector based on the region of interest and the total area including:
    extracting a first set of characteristics from the region of interest; and extracting a second set of characteristics from the total area.

20. A non-transitory computer readable medium comprising instructions that, when executed by a processor, cause the processor to perform operations, the operations comprising:
- accessing an image of a road surface that is generated by a camera, the image including pixels, each of the pixels having an intensity value;
- determining a region of interest from the image, the region of interest including pixels from the image;
- determining a total area from the image, the total area including pixels from the image, wherein the total area includes pixels in the region of interest and pixels in an area of the image adjacent the region of interest;
- extracting a feature vector based on the region of interest and the total area; and
- determining a road condition based on the feature vector and a classifier.

* * * * *